June 8, 1937. E. C. LONG 2,083,533
PISTON FOR INTERNAL COMBUSTION MOTORS
Filed Oct. 27, 1934
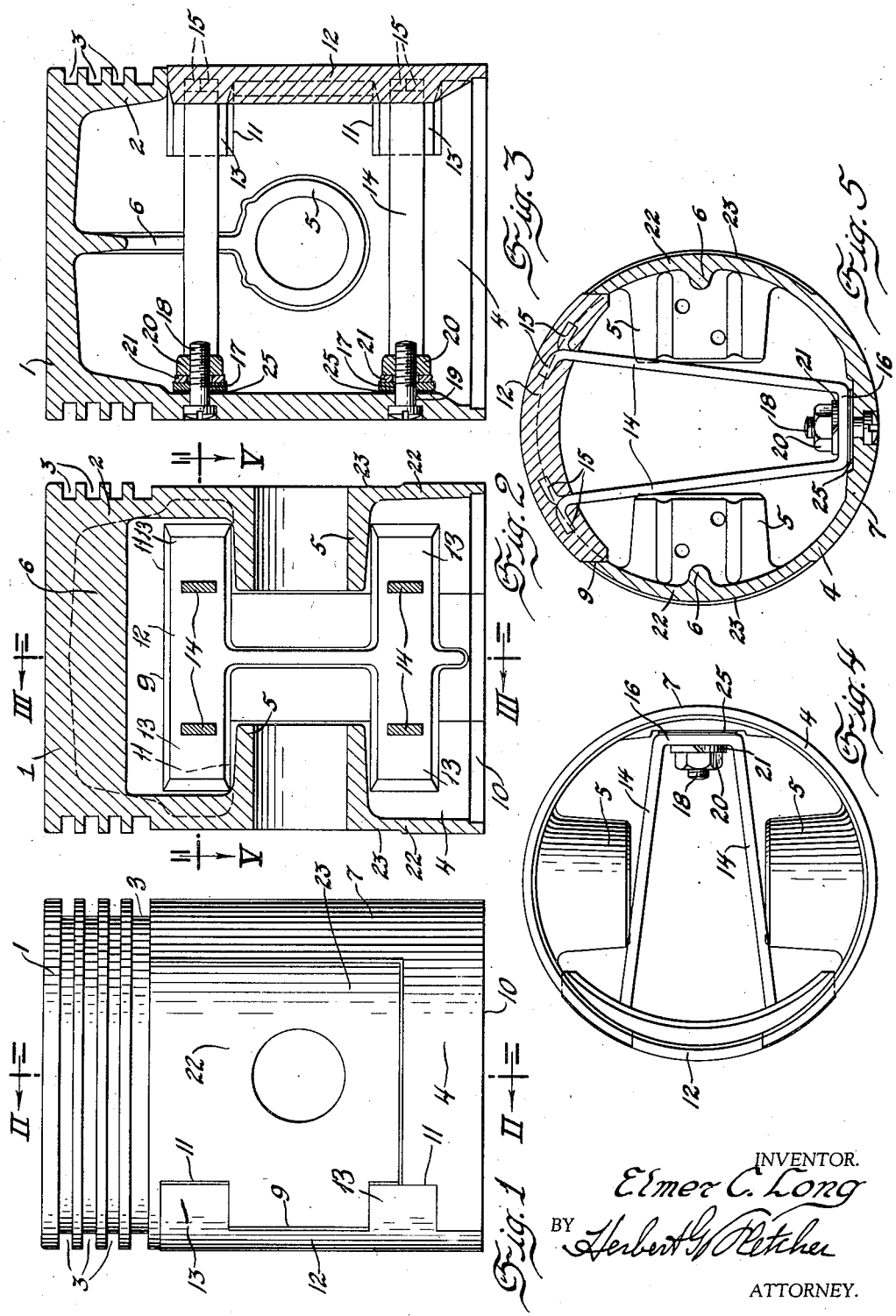
INVENTOR.
Elmer C. Long
BY Herbert G. Fletcher
ATTORNEY.

Patented June 8, 1937

2,083,533

UNITED STATES PATENT OFFICE 2,083,533

PISTON FOR INTERNAL COMBUSTION MOTORS

Elmer C. Long, Grosse Pointe Park, Mich.

Application October 27, 1934, Serial No. 750,247

7 Claims. (Cl. 309—13)

This invention relates to pistons for internal combustion motors and pertains more particularly to that character of pistons made of aluminum alloy.

The main object of the invention is to provide a piston with a structure in the skirt thereof for maintaining the power thrust side of the skirt at all times against the cylinder wall, and for providing expansion clearance of the skirt on the compression thrust side of the piston without there being any crowding or seizing of the skirt with the cylinder, and at the same time permitting only a minimum clearance between the piston and cylinder, whereby back-slap is entirely eliminated.

Another object of the invention is to provide one thrust side of the piston skirt with a cylinder bearing block which will be unaffected by expansion of the piston.

Specifically, the invention resides to provide a piston having an inserted cylinder bearing block in one of its thrust sides, extending the approximate length of the skirt, and is supported from the other thrust side by a structure of a material different than the piston, wherein the piston body may expand or contract independently of the bearing block and its supporting structure.

A further object of the invention is to provide a piston with an inserted cylinder bearing block or portion on one side of the skirt, and the inserted cylinder bearing block or portion having the supporting member therefor, cast therein at one end and the other end of the supporting member being bolted or riveted to the opposite side of the skirt.

Other and further objects will appear in the specification and be specifically pointed out in the appended claims, reference being had to the accompanying drawing, exemplifying the invention, and in which:—

Figure 1 is a side elevation of the piston taken on one of the pin boss sides.

Figure 2 is a vertical section taken approximately on the line II—II of Fig. 1.

Figure 3 is a vertical section taken approximately on the line III—III of Fig. 2.

Figure 4 is an inverted view of Fig. 1.

Figure 5 is a transverse section taken on the line V—V of Fig. 2.

Referring by numerals to the accompanying drawing, this improved piston comprises a head 1 having a side wall 2 with packing ring grooves 3 on its outer periphery, and formed integral with the surrounding side wall 2 of the head is a skirt 4.

Opposing pin bosses 5 are formed integral with and extend inwardly from the skirt, and joining the top side of each pin boss is a rib 6, said ribs extending upwardly and joining across the head, as shown in Figs. 2 and 3.

In carrying out the invention, the skirt 4 of the piston on the side diametrically opposite from the power thrust side 7, is cut out as designated at 9, from the open end 10 of the skirt to a plane below the lowermost packing ring groove 3. Formed in each side edge of the cut out 9 are a pair of recesses 11, and mounted in the cut out 9 is a cylinder bearing block or shoe 12 having a pair of extending tongues 13 on each side edge, each tongue interlocking with a respective recess 11.

For supporting the cylinder bearing block 12 within the cut out part 9 of the skirt, a pair of U-shaped members 14 is provided, one of said members being transversely disposed on a plane above the pin bosses 5 and the other member being transversely disposed on a plane below the pin bosses. The extending ends of the U-shaped members 14 are provided with angular portions 15 which are embedded in the cylinder bearing block 12 during the casting operation of the block. The base 16 of each U-shaped member 14 is provided with an opening 17, said openings providing for securing the supporting members 14 to the power thrust side 7 of the skirt by mounting a bolt 18 through each opening. Each bolt 18 is passed through a respective opening 19 which is formed in the power thrust side 7 of the skirt, said bolts being locked in engagement with the supporting members 14 by respective nuts 20 and lock washers 21.

The cylinder bearing shoe 12 when secured in circumferential alinement with the skirt wall, provides the compression thrust side for the piston, and when the piston has been assembled and machine completed ready for assembly in a cylinder of an internal combustion motor, the diameter of the skirt across the power thrust side 7 and the cylinder bearing block 12 and/or compression thrust side, should be the diameter of the cylinder minus a minimum operating clearance.

The cylinder bearing block 12 may be of any good bearing material, but the supporting members 14 therefor which also serve as thrust members for the block, must be of a material having a relatively low co-efficient of thermal expansion comparable with the relatively highly expansive material of the body portion of the piston.

As shown in Figs. 1, 2 and 5, the skirt 4 on each pin boss side 22 is provided with a clearance 23 for permitting expanding clearance of the piston on the pin boss sides, and in practice the cylinder bearing block 12 may be positioned so that the periphery thereof will project a minimum distance beyond the periphery of the piston body. In this connection when expansion of the piston body occurs, the expanding enlargement thereof will be from the power thrust side 7 to the bearing block 12 wherein the aluminum alloy piston body will move in expanding growth independently of the bearing block.

When the motor and/or the piston becomes heated, expansion of the aluminum alloy piston body will occur, and the direction of expansion with respect to the cylinder will be from the power thrust side 7 to the compression thrust side or cylinder bearing block 12, and as an original minimum operating clearance has been provided to the skirt on a diameter across the thrust sides, there will be no seizing of the aluminum body due to growing enlargement of the skirt as the members 14 will not grow by expansion on account of them having a low co-efficient of thermal expansion.

Owing to the difference in materials of the piston body and the supports 14 for the cylinder bearing block 12, it is clear how independent expansion and contraction of the piston body relative to the cylinder bearing block is permitted, and it is apparent that the amount of projection of the cylinder bearing block 12 beyond the periphery of the piston body, must be an amount at least equal to the maximum amount of expansion necessitated. For obtaining a precise adjustment of the bearing block 12, due to wear or otherwise, shims 25 may be mounted on the bolts 18 between the base 16 of respective members 14 and the skirt wall.

Having thus described the invention so that those skilled in the art will be able to practice the same, what I desire to secure by Letters Patent is defined in what is claimed, it being understood that various changes in the piston shown and described in detail and not amounting to invention, may be made without departing from the spirit and scope of my invention.

What I claim is:—

1. A piston having a skirt with opposing thrust sides, one of the thrust sides of the skirt being integral with the head and the other thrust side comprising a cylinder bearing block inserted in the skirt and extending the approximate length of the skirt, and a rigid bifurcated member having means for adjustably securing one end to the integral thrust side of the skirt and its extending ends embedded in the cylinder bearing block.

2. A piston made of a material having a relatively high co-efficient of thermal expansion and having a skirt with opposing thrust sides, one of the thrust sides of the skirt being integral with the head, and the other thrust side comprising a cylinder bearing block inserted in the skirt and extending the approximate length of the skirt, and a rigid bifurcated member having a relatively low co-efficient of thermal expansion connected at one end to the integral thrust side and at its extending ends to the cylinder bearing block.

3. A piston comprising a head having a skirt and pin bosses, the skirt having opposing thrust sides one of which is formed integral with the head, the other thrust side comprising a cylinder bearing block inserted in the skirt and extending the approximate length of the skirt, and a pair of rigid transversely disposed bifurcated members secured at one end to the integral thrust side of the skirt and at their extending ends to the cylinder bearing block, one of said bifurcated members being disposed on a transverse plane above the pin bosses and the other member being disposed on a transverse plane below the pin bosses.

4. A piston for an internal combustion motor comprising a relatively highly expansive body portion having a skirt, a cylinder bearing block of the approximate length of the skirt inserted in the wall thereof, and a pair of rigid bifurcated members having a relatively low co-efficient of thermal expansion comparable with the piston body, each of said members being secured at one end to the skirt and at their extending ends to the block.

5. A piston for an internal combustion motor comprising a relatively highly expansive body portion having a skirt, a cylinder bearing block of the approximate length of the skirt inserted in the wall thereof, said block having an extending portion on each side edge thereof in engagement with respective recesses formed in the skirt, and a rigid bifurcated member having a relatively low co-efficient of thermal expansion comparable with the piston body, said member being secured at one end to the skirt and at its extending ends to the block.

6. A piston having a skirt with an open end, a cylinder bearing block extending from the open end of the skirt and being inserted in the skirt, the side edges of said block having a projecting portion, a respective recess formed in the skirt for the reception of the projecting portions of the block, and a rigid member connected to said block having its other end secured to the opposite side of the skirt.

7. A piston having a skirt, a cylinder bearing block inserted in the skirt, and a rigid bifurcated member connected at one end to one side of the skirt and having its extending ends embedded in the cylinder bearing block.

ELMER C. LONG.